US008961076B2

(12) United States Patent
Ishi et al.

(10) Patent No.: US 8,961,076 B2
(45) Date of Patent: Feb. 24, 2015

(54) CUTTING INSERT, CUTTING TOOL, AND METHOD OF MANUFACTURING MACHINED PRODUCT USING THE SAME

(75) Inventors: Hirohisa Ishi, Higashiomi (JP); Yongbo Xu, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 332 days.

(21) Appl. No.: 13/375,011

(22) PCT Filed: Jun. 28, 2010

(86) PCT No.: PCT/JP2010/060966
§ 371 (c)(1),
(2), (4) Date: Nov. 29, 2011

(87) PCT Pub. No.: WO2010/150907
PCT Pub. Date: Dec. 29, 2010

(65) Prior Publication Data
US 2012/0070240 A1    Mar. 22, 2012

(30) Foreign Application Priority Data

Jun. 26, 2009  (JP) ................................. 2009-151808
Oct. 29, 2009  (JP) ................................. 2009-249556

(51) Int. Cl.
| B23B 27/22 | (2006.01) |
| B23C 5/06 | (2006.01) |
| B23C 5/20 | (2006.01) |
| B23B 29/00 | (2006.01) |

(52) U.S. Cl.
CPC . *B23C 5/06* (2013.01); *B23C 5/202* (2013.01); *B23C 2200/0444* (2013.01); *B23C 2200/201* (2013.01); *B23C 2200/208* (2013.01)
USPC ............................................ 407/42; 407/113

(58) Field of Classification Search
USPC ............................................. 407/42, 61, 113
See application file for complete search history.

(56) References Cited

U.S. PATENT DOCUMENTS

| 5,807,031 A | 9/1998 | Arai et al. |
| 5,904,450 A | 5/1999 | Satran et al. |
| 6,065,907 A * | 5/2000 | Ghosh et al. ................... 407/114 |
| 6,238,146 B1 | 5/2001 | Satran et al. |
| 6,786,682 B1 | 9/2004 | Wiman |
| 7,261,497 B2 * | 8/2007 | Maeda .......................... 407/113 |
| 7,476,062 B2 * | 1/2009 | Waggle ......................... 407/113 |

(Continued)

FOREIGN PATENT DOCUMENTS

| CN | 1137960 A | 12/1996 |
| CN | 101096057 | 1/2008 |
| JP | 4-136613 | 12/1992 |

(Continued)

*Primary Examiner* — Will Fridie, Jr.
(74) *Attorney, Agent, or Firm* — Volpe and Koenig, P.C.

(57) ABSTRACT

A cutting insert of the present invention includes an upper surface; a lower surface; a side surface; a cutting edge which is located along an intersection of the upper surface and the side surface, and comprises a major cutting edge, a flat cutting edge, and a minor cutting edge located between the major cutting edge and the flat cutting edge; and a land part located along the cutting edge on the upper surface. The land part includes a minor cutting edge land portion located correspondingly to the minor cutting edge. The minor cutting edge land portion is inclined downward toward a central part of the upper surface. The present invention also provides a cutting tool including the cutting insert, and a method of manufacturing a machined product by using the cutting tool.

16 Claims, 13 Drawing Sheets

(56) References Cited

U.S. PATENT DOCUMENTS

| | | | |
|---|---|---|---|
| 7,905,687 B2 * | 3/2011 | Dufour et al. | 407/42 |
| 2007/0297865 A1 * | 12/2007 | Hessman | 407/114 |

FOREIGN PATENT DOCUMENTS

| | | | |
|---|---|---|---|
| JP | 08-057709 | | 3/1996 |
| JP | 08057709 A * | 3/1996 | B23C 5/20 |
| JP | 08-323510 | | 12/1996 |
| JP | 3044684 | | 1/1998 |
| JP | 11-347826 | | 12/1999 |
| JP | 2001157903 | | 6/2001 |
| JP | 2004-090198 | | 3/2004 |
| JP | 2006-075913 | | 3/2006 |
| JP | 2006082168 A * | | 3/2006 |
| JP | 2008-006579 | | 1/2008 |

* cited by examiner (a)

(b)

(a)

(b)

(a)

(b)

(c)

CUTTING INSERT, CUTTING TOOL, AND METHOD OF MANUFACTURING MACHINED PRODUCT USING THE SAME

TECHNICAL FIELD

The present invention relates to a cutting insert, a cutting tool, and a method of manufacturing a machined product using the same.

BACKGROUND ART

Conventionally, in a cutting insert including a major cutting edge for cutting a workpiece and a flat cutting edge for smoothing the surface of the workpiece produced by the cutting, a minor cutting edge having a larger peripheral cutting edge angle than the major cutting edge is formed between the major cutting edge and the flat cutting edge from the viewpoint of damage reduction of a cutting edge. For example, Japanese Unexamined Patent Publication No. 2008-6579 discloses a cutting insert in which the angle formed between a major cutting edge and a flat cutting edge is 45°, and an intermediate cutting edge 11 (minor cutting edge) having a larger peripheral cutting edge angle than the major cutting edge is formed between the major cutting edge and the flat cutting edge.

However, the thrust force on the minor cutting edge during cutting increases in these cutting inserts. Therefore, vibration (chatter phenomenon) is likely to occur during the cutting, and the quality of a finished surface may deteriorate.

Also, it has been difficult for these cutting inserts to conform to a plurality of cutting conditions from general feed to high feed (high feed rate cutting).

SUMMARY OF THE INVENTION

An object of the present invention is to provide a cutting insert, a cutting tool, and a method of manufacturing a machined product using the same, which are capable of forming a superior finished surface.

Other object of the present invention is to provide a cutting insert, a cutting tool, and a method of manufacturing a machined product using the same, which are capable of conforming to a plurality of cutting conditions from general feed (for example, feed per tooth: 0.1 mm/t or more and less than 0.4 mm/t) to high feed (high feed rate cutting) (for example, feed per tooth: 0.4 mm/t or more).

A cutting insert according to an embodiment of the present invention includes an upper surface; a lower surface; a side surface; a cutting edge which is located along an intersection of the upper surface and the side surface, and comprises a major cutting edge, a flat cutting edge, and a minor cutting edge located between the major cutting edge and the flat cutting edge; and a land part located along the cutting edge on the upper surface. The land part includes a minor cutting edge land portion located correspondingly to the minor cutting edge. The minor cutting edge land portion is inclined downward toward a central part of the upper surface.

A cutting insert according to other embodiment of the present invention features that the land part further includes a major cutting edge land portion located correspondingly to the major cutting edge, and a flat cutting edge land portion located correspondingly to the flat cutting edge. When in a width of the minor cutting edge land portion in a direction orthogonal to the minor cutting edge, a width at an end portion close to the flat cutting edge land portion is denoted by W1a, and a width at an end portion close to the major cutting edge land portion is denoted by W1b, the W1a and the W1b have a relationship of W1a<W1b in a top view. When in an inclination angle of the minor cutting edge land portion on the basis of a line L1 passing through the minor cutting edge and being orthogonal to a center axis of the cutting insert, an inclination angle at an end portion close to the flat cutting edge land portion is denoted by θ1a, and an inclination angle at an end portion close to the major cutting edge land portion is denoted by θ1b, the θ1a and the θ1b have a relationship of θ1a>θ1b.

A cutting tool of the present invention includes the cutting insert and a holder configured to attach the cutting insert thereto.

A method of manufacturing a machined product according to an embodiment of the present invention includes rotating the cutting tool; bringing the cutting edge of the rotating cutting tool into contact with a surface of a workpiece; and separating the cutting tool from the workpiece.

In the cutting insert according to the embodiment of the present invention, the minor cutting edge land portion is disposed correspondingly to the minor cutting edge which has a larger peripheral cutting edge angle than the major cutting edge, and therefore the cutting resistance exerted thereon during cutting is likely to increase. The minor cutting edge land portion is inclined downward toward the central part. Therefore, the thrust force can be decreased by relatively decreasing the cutting resistance exerted on the minor cutting edge during the cutting. Consequently, the vibration caused due to the thrust force during the cutting can be effectively reduced, thereby improving the finished surface of the machined product.

In the cutting insert according to the other embodiment of the present invention, the strength of the part of the minor cutting edge close to the major cutting edge is enhanced by increasing the width at the end portion of the minor cutting edge land portion close to the major cutting edge, and by decreasing the inclination angle thereof. Additionally, the cutting performance of the part of the minor cutting edge close to the flat cutting edge is enhanced by decreasing the width at the end portion of the minor cutting edge land portion close to the flat cutting edge, and by increasing the inclination angle thereof. Thus, the minor cutting edge achieves a satisfactory balance between the strength required for the major cutting edge and the cutting performance required for the flat cutting edge. Therefore, during the general cutting, the cutting can be carried out by the minor cutting edge in addition to the major cutting edge, and the finished surface can be smoothed by the flat cutting edge. On the other hand, during the high feed (high feed rate cutting), the cutting is carried out only by the major cutting edge, and the finished surface can be smoothed by the minor cutting edge instead of the flat cutting edge.

PREFERRED EMBODIMENTS FOR CARRYING OUT THE INVENTION

Cutting Insert (First Embodiment)

The first embodiment of the cutting insert (hereinafter referred to as "insert" in some cases) according to the present invention is described in detail below with reference to FIGS. 1 to 4.

Figure 1:
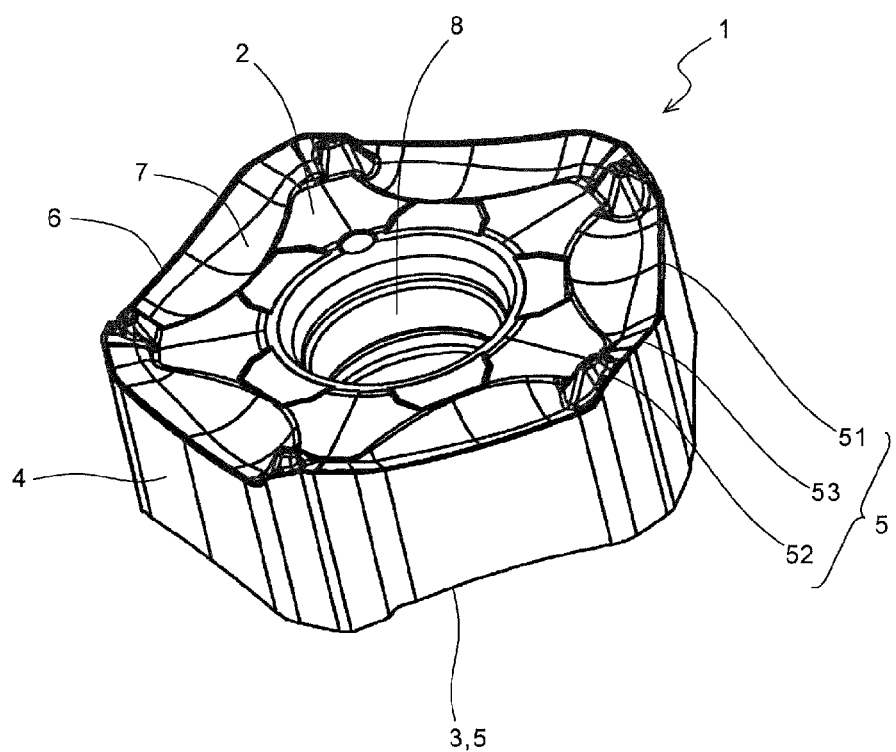
FIG. 1 is a general perspective view showing a cutting insert according to a first embodiment of the present invention.

Referring to FIG. 1, the insert 1 includes a body part of a substantially polygonal plate shape. No particular limitation is imposed on the shape of the body part. That is, the body part may have a certain shape usually employed by those skilled in the art, such as triangle, quadrangle, pentagon, hexagon, and octagon in a top view. The present embodiment employs a substantially pentagonal shape having five long sides. The insert size may be suitably set depending on cutting conditions. For example, the length of one side is 8-12 mm, and the thickness is 4-8 mm.

The body part also includes an upper surface 2 functioning as a rake face, a lower surface 3 functioning as a seating face, and a side surface 4 which is connected to the upper surface 2 and the lower surface 3, and functions as a flank face. The rake face is the part that performs a role in a smooth chip discharge to the exterior by changing the chip movement direction and changing chip shape (into a helical shape or the like) upon contact of chips generated by cutting edges 5. The seating face is the part that touches a holder when the insert 1 is attached to the holder. The cutting edges 5 are respectively formed along the intersection of the upper surface 2 and the side surface 4. Further, the upper surface 2 corresponding to the rake face is provided with an attachment screw contact portion 8 extending through the body part from the upper surface 2 to the lower surface 3. The attachment screw contact portion 8 is formed at the central part of the upper surface 2.

To be specific, in the insert 1, the side surface 4 is vertically connected to the upper surface 2 and the lower surface 3. That is, the insert 1 is a negative-type insert allowing both the upper surface 2 and the lower surface 3 to be used as the rake face. Therefore, the insert 1 is the insert whose ten corners are usable. In this case, the cutting edge 5 is also formed along the intersection of the lower surface 3 and the side surface 4. When using the cutting edge 5 close to the lower surface, the lower surface 3 is used as the rake face, and the upper surface 2 is used as the seating face. Thus, the insert of the present embodiment can perform cutting using both the upper surface 2 and the lower surface 3. Hence, there is a relationship that the length of a flat cutting edge of the upper surface 2 in a top view and the length of a minor cutting edge of the lower surface 3 in a bottom view are equal to each other, or vice versa. There is also a similar relationship between the cutting edge close to the upper surface 2 corresponding to the same side surface 4 and the cutting edge close to the lower surface 3. Alternatively, the insert of the present embodiment may be the so-called positive-type insert in which a clearance angle is imparted to the side surface 4.

The cutting edges 5 formed along the intersection of the upper surface 2 and the side surface 4 include a major cutting edge 51, a flat cutting edge 52, and a minor cutting edge 53 disposed between the major cutting edge 51 and the flat cutting edge 52. Further in the present embodiment, as shown in FIG. 2(a), a first corner cutting edge 54 is formed between the major cutting edge 51 and the minor cutting edge 53, and a second corner cutting edge 55 is formed between the minor cutting edge 53 and the flat cutting edge 52. The cutting edges 5 may have a linear shape or curved shape in a top view.

The major cutting edge 51 performs a major role in the formation of chips during cutting action. The major cutting edge 51 is configured to be the longest among the cutting edges 5 (51-55).

No particular limitation is imposed on the shape of the major cutting edge 51. The major cutting edge 51 may have a linear shape or curved shape (arcuate shape) in a top view. In view of the fact that when attaching to the holder, the major cutting edge 51 easily has an axial rake with respect to the rotation center axis of the holder, the major cutting edge 51 is preferably inclined downward away from the adjacent minor cutting edge 53 in a side view, as shown in FIG. 2(b). In the present specification, the term "downward" means the lower surface side on the basis of a plane orthogonal to the center axis of the insert.

In the present embodiment, the major cutting edge 51 has the linear shape in the top view as shown in FIGS. 1 and 2(a). The major cutting edge 51 has a concave shape being concave toward the lower surface 3, and a straight line connecting both ends thereof is inclined with respect to the lower surface 3 in the side view as shown in FIG. 2(b). From the viewpoint of cutting resistance reduction, the major cutting edge 51 may be provided with a groove portion that divides the major cutting edge 51.

The flat cutting edge 52 is formed in order to improve the surface finish roughness of a workpiece. The flat cutting edge 52 has a linear shape in the top view as shown in FIGS. 1 and 2(a), and is inclined upward toward the minor cutting edge 53 in the side view as shown in FIG. 2(b). In the present specification, the term "upward" means the direction on the side opposite the lower surface side on the basis of the plane orthogonal to the center axis of the insert.

The minor cutting edge 53 has a larger peripheral cutting edge angle than the major cutting edge 51, and is disposed in order to support the cutting by the major cutting edge 51, for example, for the purpose of decreasing the cutting resistance of the major cutting edge 51, or reducing damage to the major cutting edge 51.

Figure 2:
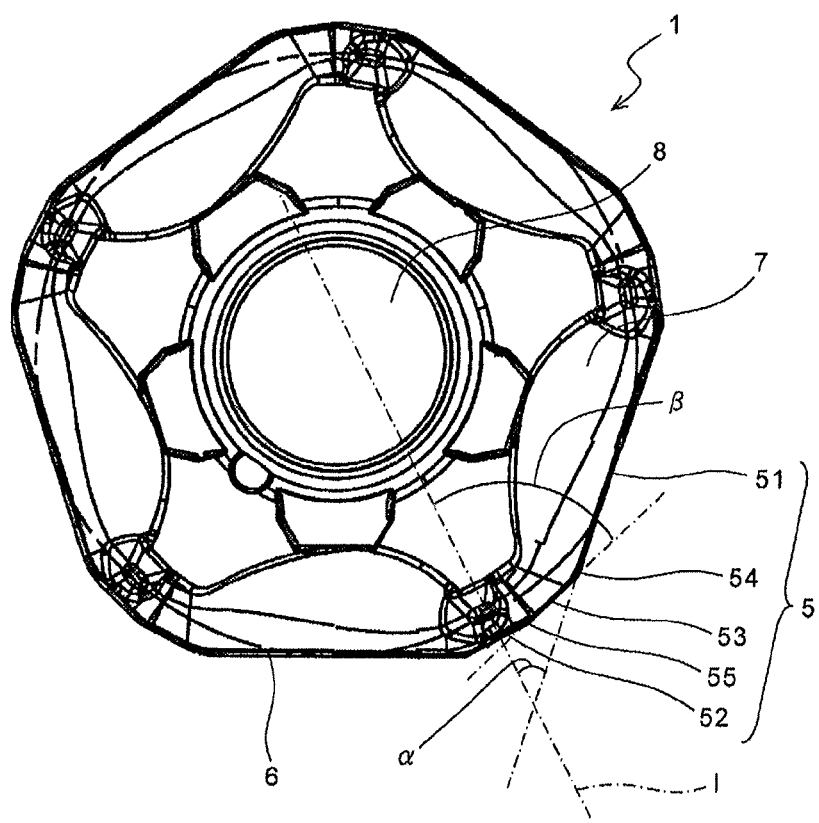
FIG. 2(a) is a top view of the cutting insert shown in FIG. 1.
FIG. 2(b) is a side view thereof.
Figure 2:
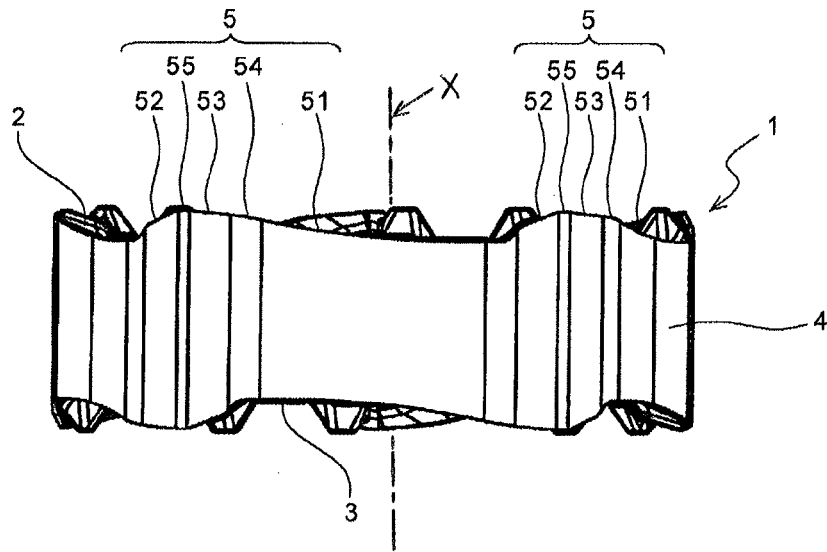

In the present specification, the term "peripheral cutting edge angle" means an inclination angle of the cutting edge with respect to the rotation center axis of the holder when the insert is attached to the holder. For example, as shown in FIG. 2(*a*), the peripheral cutting edge angle of the major cutting edge 51 can be expressed by an angle α formed between a line 1 parallel to the rotation center axis of the holder, and a virtual extension line of the major cutting edge 51 in a top view. The peripheral cutting edge angle of the minor cutting edge 53 can be expressed by an angle β formed between the line 1 and a virtual extension line of the minor cutting edge 53.

For example, the peripheral cutting edge angle α of the major cutting edge 51 is set to approximately 0-60°, and the peripheral cutting edge angle β of the minor cutting edge 53 is set to approximately 60-80°. In consideration of damage and defect in the cutting edges 5, the peripheral cutting edge angle β of the minor cutting edge 53 is set to 1.2 times or more, preferably 1.5 times or more the peripheral cutting edge angle α of the major cutting edge 51. The minor cutting edge 53 is only required to locate between the major cutting edge 51 and the flat cutting edge 52, and a plurality of minor cutting edges may be disposed therebetween.

Referring to FIG. 2(*b*), the minor cutting edge 53 is preferably inclined downward from the flat cutting edge 52 to the major cutting edge 51 in a side view. Particularly, the minor cutting edge 53 preferably has such an inclination angle as to have a positive axial rake with the insert 1 attached to the holder.

No particular limitation is imposed on the lengths of the major cutting edge 51, the flat cutting edge 52, and the minor cutting edge 53 so long as the major cutting edge 51 is configured to be the longest among the cutting edges 5. For example, the length of the major cutting edge 51 and the length of the minor cutting edge 53 are set in the ratio of 2:1 to 10:1, preferably 2:1 to 6:1. The length of the flat cutting edge 52 and the length of the minor cutting edge 53 are set in the ratio of 1:1 to 6:1. When designing a negative type insert, the length of the flat cutting edge and the length of the minor cutting edge are usually set in the ratio of 1:1.

Both the first corner cutting edge 54 and the second corner cutting edge 55 have a curved shape in a top view, and are formed so that the radius of curvature of the first corner cutting edge 54 is larger than the radius of curvature of the second corner cutting edge 55. This reduces large thickness variation among chips respectively generated from the major cutting edge 51 and the minor cutting edge 53, thus permitting shape control of the chips. Alternatively, the first corner cutting edge 54 and the second corner cutting edge 55 may have a linear shape.

Figure 3:
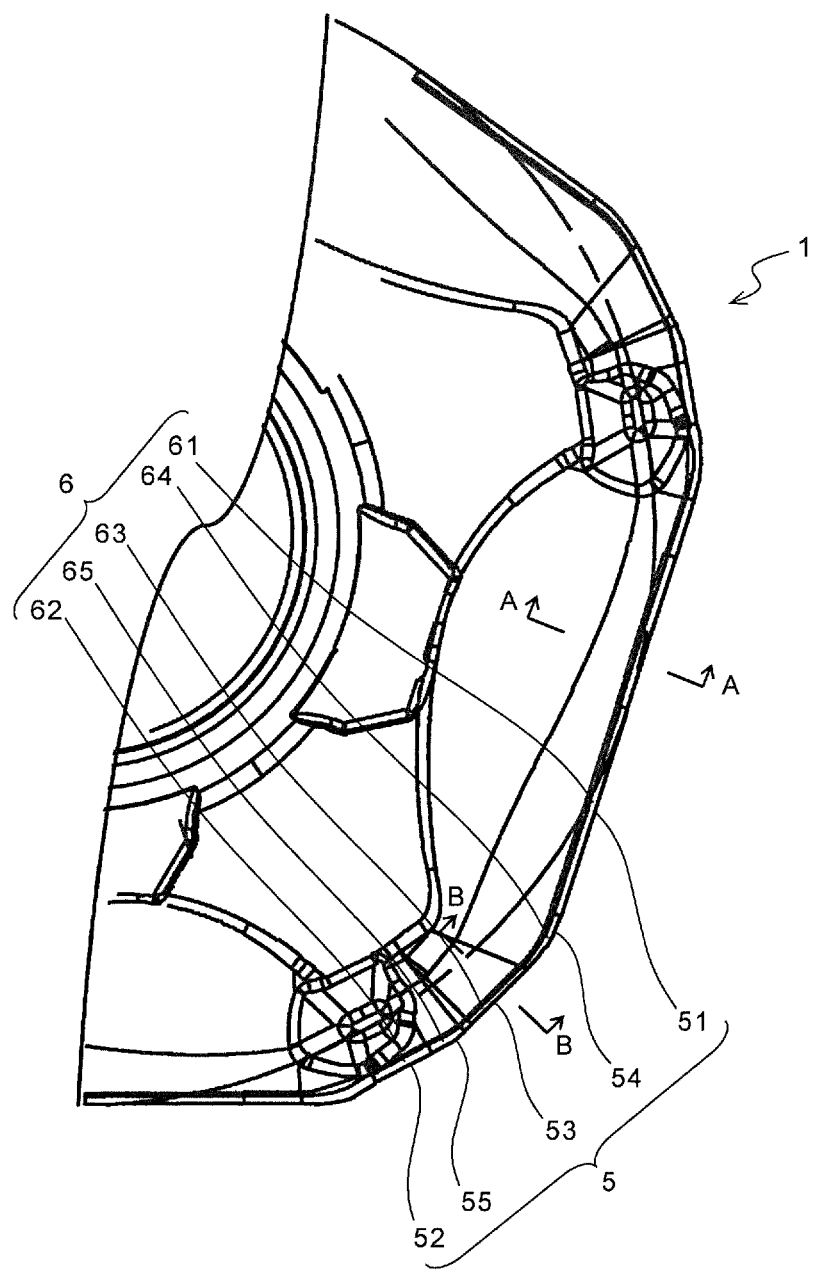
FIG. 3 is a partially enlarged view of the cutting insert shown in FIG. 2(a)

Referring to FIGS. 1 and 2(*a*), land parts 6 are respectively formed along the cutting edges 5 on the upper surface 2. That is, as shown in FIG. 3, the land parts 61-65 are formed correspondingly to the cutting edges 51-55. Specifically, each of the land parts 6 is a narrow width band-shaped face formed between the cutting edge 5 and the rake face, and indicates the face whose angle with respect to the line passing through the cutting edge 5 and being orthogonal to the center axis of the insert is smaller than that of the rake face. These land parts 6 are formed for enhancing the tip strength of the cutting edges 5. In the present invention, the land part located correspondingly to the major cutting edge 51 is referred to as a major cutting edge land portion 61, the land part located correspondingly to the flat cutting edge 52 is referred to as a flat cutting edge land portion 62, and the land part located correspondingly to the minor cutting edge 53 is referred to as a minor cutting edge land portion 63. The land part located correspondingly to the first corner cutting edge 54 is referred to as a first corner cutting edge land portion 64, and the land part located correspondingly to the second corner cutting edge 55 is referred to as a second corner cutting edge land portion 65. In the insert 1, the cutting edges 5 are formed along the entire circumference of an edge part, and the land parts 6 are formed on the inside thereof in a top view.

The widths of the land parts 61-65 may be suitably set depending on the tip strengths of the cutting edges 51-55 and the cutting resistances exerted thereon during cutting. From the viewpoint of size (thickness) control of the chips generated from the cutting edges 51-55, the width of the major cutting edge land portion 61 and the width of the minor cutting edge land portion 63 are preferably set in the ratio of 1:0.7 to 1:1.3. Alternatively, the ratio of the width of the major cutting edge land portion 61 and the width of the minor cutting edge land portion 63 may be substantially identical to each other (approximately 1:1).

Figure 4:
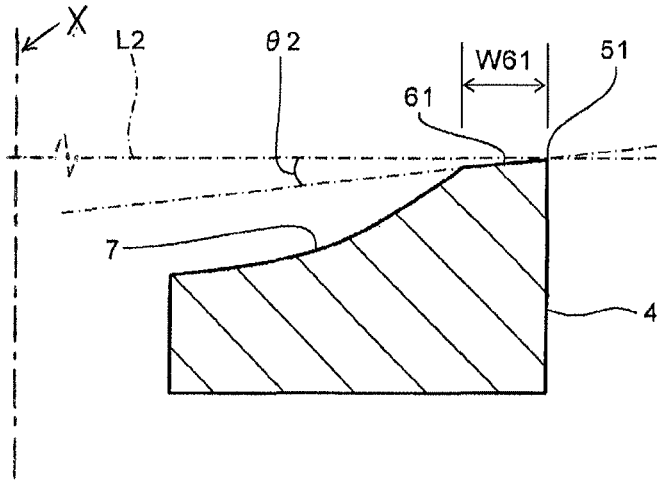
FIG. 4(a) is a schematic sectional view taken along the line A-A in FIG. 3.
FIG. 4(b) is a schematic sectional view taken along the line B-B in FIG. 3.
Figure 4:
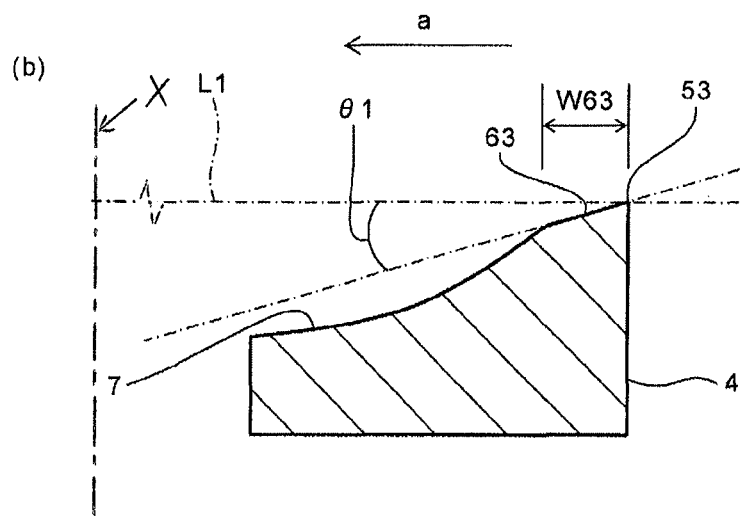

Here at, the width of each of the land parts 6 indicates a distance in a direction orthogonal to the cutting edge 5 in a top view. The largest one among the widths of the corresponding land parts is employed as the width of the land part 6. In the present embodiment, as shown in FIG. 4, a width W61 of the major cutting edge land portion 61 and a width W63 of the minor cutting edge land portion 63 have a relationship of W61=W63. More preferably, the widths of the land parts 61-65 are respectively substantially constant.

In the present embodiment, as shown in FIG. 4(*b*), the minor cutting edge land portion 63 is inclined downward toward the central part of the upper surface 2, as shown in the direction of arrow a. This decreases the cutting resistance during cutting, and also decreases the thrust force during the cutting. Therefore, the vibration during the cutting can be reduced, thereby achieving the superior finished surface. In the present embodiment, the minor cutting edge land portion 63 is configured to have an inclination angle θ1, as described later.

The land parts 61, 62, 64, and 65, except for the minor cutting edge land portion 63, may be flat or inclined in one direction. The term "one direction" means a downward direction or upward direction.

Referring to FIG. 4(*a*), from the viewpoint of the cutting resistance reduction, the major cutting edge land portion 61 is preferably inclined downward toward the central part of the upper surface 2, and a larger inclination angle thereof is more suitable. This provides a more superior finished surface. In the meantime, the major cutting edge land portion 61 preferably has a smaller inclination angle from the viewpoint of reinforcement of the major cutting edge 51.

The minor cutting edge land portion 63 is preferably configured to have a larger inclination angle than the major cutting edge land portion 61. In the insert with two kinds of cutting edges having different peripheral cutting edge angles, namely, the major cutting edge 51 and the minor cutting edge 53, these two cutting edges differ from each other in their cutting force balance. Owing to the foregoing configuration, the present embodiment maintains a satisfactory cutting force balance between the major cutting edge 51 and the minor cutting edge 53, thereby reducing the vibration (chatter phenomenon) during cutting.

To be specific, as shown in FIG. 4, when θ1 denotes an inclination angle of the minor cutting edge land portion 63 on the basis of a line L1 passing through the minor cutting edge 53 and being orthogonal to the center axis X of the insert 1, and θ2 denotes an inclination angle of the major cutting edge land portion 61 on the basis of a line L2 passing through the major cutting edge 51 and being orthogonal to the center axis X of the insert 1, θ1 and θ2 have a relationship of θ1>θ2. Hereat, the inclination angle is determined as being plus (+) when it is inclined downward on the basis of L2, and is determined as being minus (−) when it is inclined upward. The difference between θ1 and θ2 is preferably at least 3° or more, more preferably 3-10°.

The major cutting edge land portion 61 and the minor cutting edge land portion 63 are connected through the first corner cutting edge land portion 64, as described above. An inclination angle of the first corner cutting edge land portion 64 on the basis of a line L3 (not shown) passing through the first corner cutting edge 54 and being orthogonal to the center axis of the insert 1 is configured to decrease from the minor cutting edge land portion 63 to the major cutting edge land portion 61. This provides stable chip discharge without irregular deformation or division. Specifically, in a sectional view, the first corner cutting edge land portion 64 is configured to be raised from the minor cutting edge land portion 63 to the major cutting edge land portion 61.

On the other hand, as shown in FIG. 1 and the like, a breaker groove 7 located correspondingly to the major cutting edge 51 is formed on the upper surface 2. The breaker groove 7 is formed for further facilitating curling of the chips generated from the major cutting edge 51. In FIG. 1, the breaker groove 7 has a concave shape.

(Second Embodiment)

A second embodiment of the cutting insert according to the present invention is described in details below with reference to FIGS. 5 to 9. In FIGS. 5 to 9, the components similar to those in FIGS. 1 to 4 are denoted by like reference numerals, and therefore the description thereof is omitted.

Figure 5:
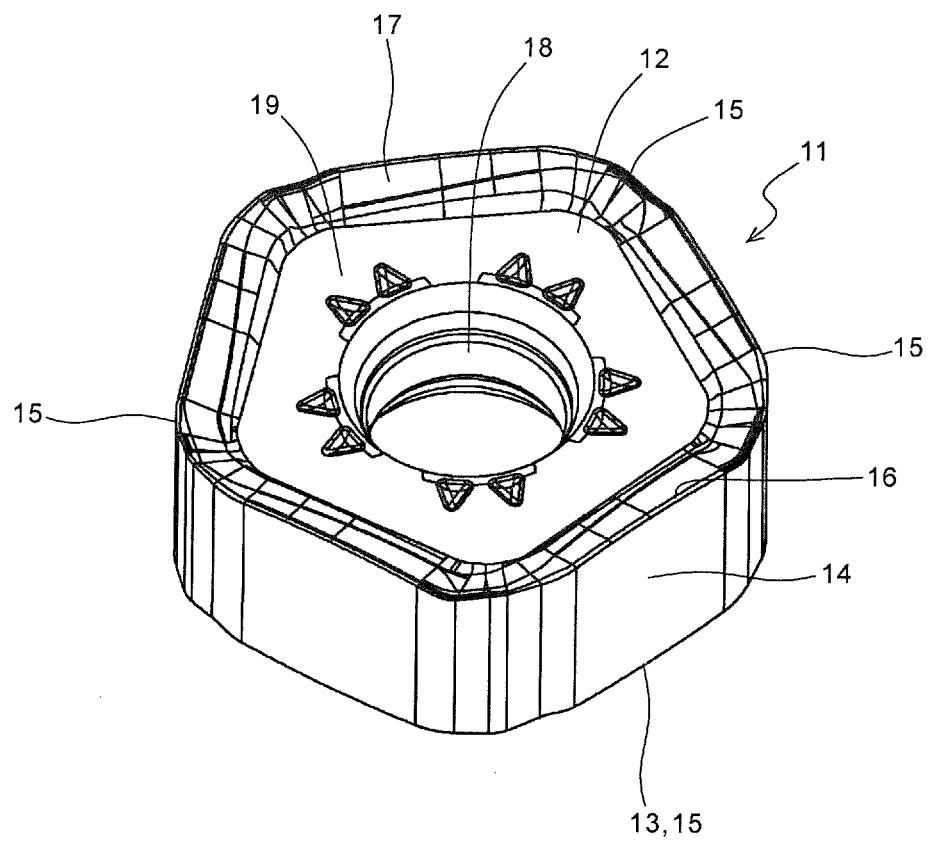
FIG. 5 is a general perspective view showing a cutting insert according to a second embodiment of the present invention.
Figure 6:
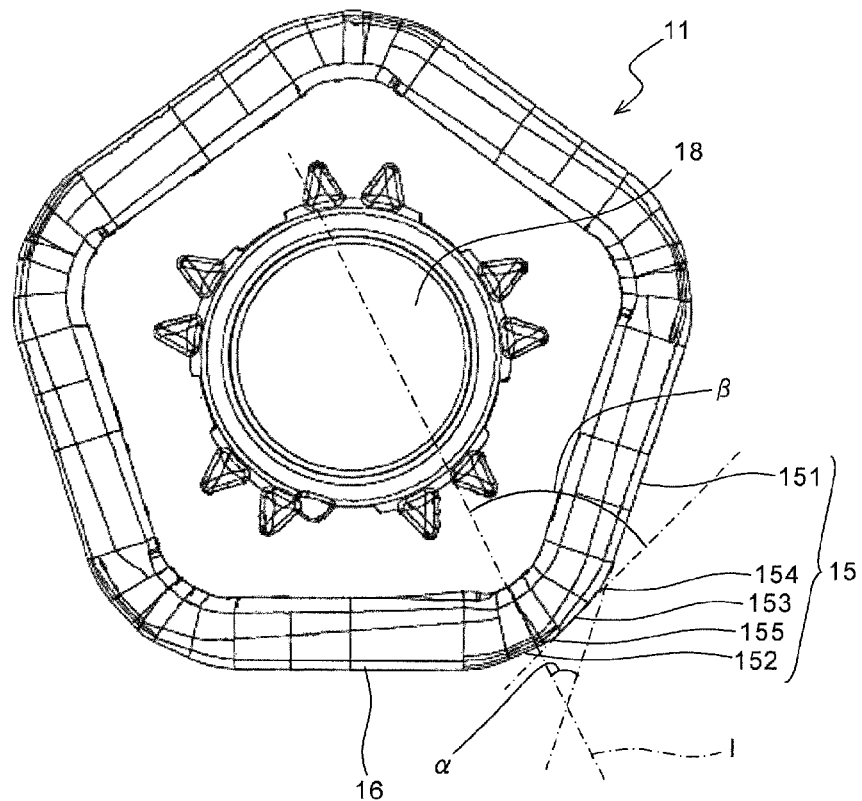
FIG. 6(a) is a top view of the cutting insert shown in FIG. 5.
FIG. 6(b) is a side view thereof.
Figure 6:
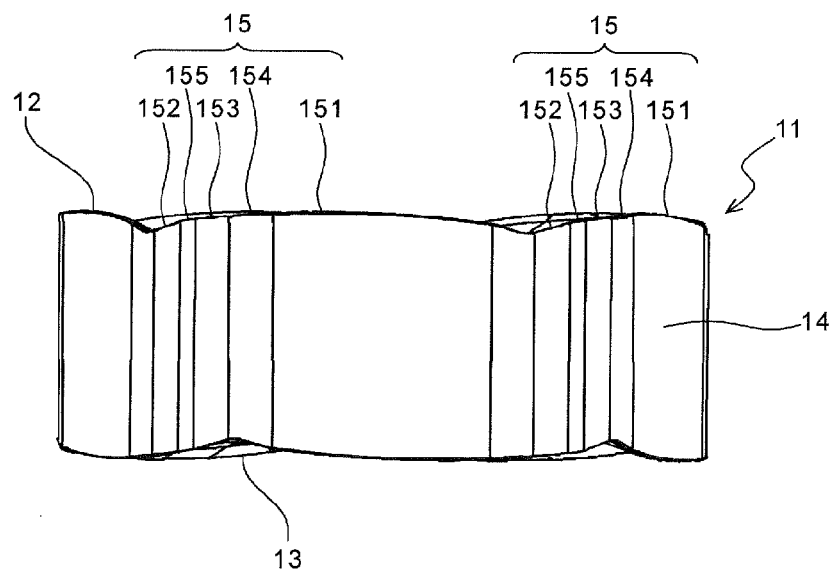

Referring to FIG. 5, the insert 11 of the present embodiment includes a body part of a substantially polygonal plate shape. The body part includes an upper surface 12, a part of which functions as a rake face 17; a lower surface 13, a part of which functions as a seating face; and a side surface 14 which is connected to the upper surface 12 and the lower surface 13, and functions as a flank face. Cutting edges 15 are formed along an intersection of the upper surface 12 and the side surface 14. A through hole 18 extending through the body part from the upper surface 12 to the lower surface 13 is formed on the upper surface 12 corresponding to a restriction face 19. The through hole 18 is formed at the central part of the upper surface 12.

Specifically, the insert 11 is a negative type insert in which the side surface 14 is vertically connected to the upper surface 12 and the lower surface 13. Therefore, the cutting edges 15 are also formed along an intersection of the lower surface 13 and the side surface 14.

Referring to FIG. 6(a), each of the cutting edges 15 includes a major cutting edge 151, a flat cutting edge 152, and a minor cutting edge 153 disposed between the major cutting edge 151 and the flat cutting edge 152. Further in the present embodiment, a first corner cutting edge 154 is formed between the major cutting edge 151 and the minor cutting edge 153, and a second corner cutting edge 155 is formed between the minor cutting edge 153 and the flat cutting edge 152.

The flat cutting edge 152 has a linear shape in the top view as shown in FIGS. 5 and 6(a), and is inclined upward toward the minor cutting edge 153 in the side view as shown in FIG. 6(b).

The minor cutting edge 153 has a larger peripheral cutting edge angle than the major cutting edge 151. For example, a peripheral cutting edge angle α of the major cutting edge 151 is set to approximately 0-60°, and a peripheral cutting edge angle β of the minor cutting edge 153 is set to approximately 60-80°. In consideration of damage and defect in the cutting edges 15, the peripheral cutting edge angle β of the minor cutting edge 153 is set to 1.2 times or more, preferably 1.5 times or more the peripheral cutting edge angle α of the major cutting edge 151.

As described later, the relatively long minor cutting edge 153 makes it possible to increase the widths of the major cutting edge land portion 161 and the flat cutting edge land portion 162, and increase their angles with respect to the side surface 14, thereby improving cutting performance.

Figure 7:
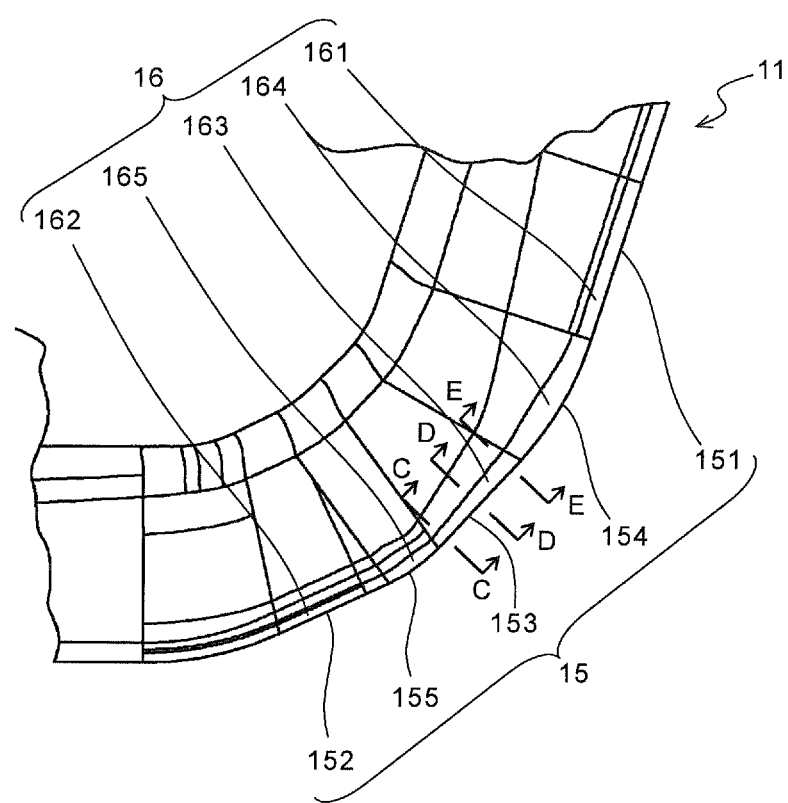
FIG. 7 is a partially enlarged view of the cutting insert shown in FIG. 6(a)

Land parts 16 are respectively formed along the cutting edges 15 on the upper surface 12, as shown in FIGS. 5 and 6(a). That is, as shown in FIG. 7, a major cutting edge land portion 161, a flat cutting edge land portion 162, a minor cutting edge land portion 163, a first corner cutting edge land portion 164, and a second corner cutting edge land portion 165 are formed correspondingly to the cutting edges 151-155, respectively. In the insert 11, the cutting edges 15 are formed along the entire circumference of an edge part, and the land parts 16 are formed on the inside thereof in a top view.

In the present embodiment, the widths of the land parts 161-165 have a relationship of (width of the flat cutting edge land portion 162)<(width of the major cutting edge land portion 161), as shown in FIGS. 7 and 8(a) to 8(c). Further, the width of the minor cutting edge land portion 163 is configured to continuously increase from the flat cutting edge land portion 162 to the major cutting edge land portion 161.

That is, FIG. 8(a) shows a cross-sectional shape of an end portion of the minor cutting edge land portion 163 close to the flat cutting edge land portion 162. FIG. 8(b) shows a cross-sectional shape of the central part of the minor cutting edge land portion 163. FIG. 8(c) shows a cross-sectional shape of an end portion of the minor cutting edge land portion 163 close to the major cutting edge land portion 161. When in the width of the minor cutting edge land portion 163, a width at the end portion close to the flat cutting edge land portion 162 is denoted by W1a, a width at the central part thereof is denoted by W1m, and a width at the end portion close to the major cutting edge land portion 161 is denoted by W1b, W1a, W1m, and W1b have a relationship of W1a<W1m<W1b in a top view.

Here at, W1a and W1b preferably have a relationship of W1a:W1b=1:1.1 to 1:4.

Thus, the reason for increasing the width W1b of the minor cutting edge land portion 163 close to the major cutting edge land portion 161 is that sufficient strength is required for protecting the major cutting edge 151 from the impact received during cutting. On the other hand, the minor cutting edge land portion 163 close to the flat cutting edge land portion 162 is used for smoothing the finished surface of the workpiece, and therefore its required strength is not so high as that of the major cutting edge land portion 161.

So long as the width of the minor cutting edge land portion 163 has the relationship of W1a<W1b, the changes of W1a, W1m, and W1b may be discontinuously increased. In an alternative, the widths of the land parts 16 may be changed in the region between the major cutting edge land portion 161 and the flat cutting edge land portion 162. That is, the widths of the land parts 16 may be continuously or discontinuously increased from the flat cutting edge land portion 162 to the major cutting edge land portion 161 over the entire region including the minor cutting edge land portion 163 and the second corner cutting edge land portion 165. In other words, the width may be changed in one or both of the first corner cutting edge land portion 164 and the second corner cutting edge land portion 165.

In still another alternative, the widths of the land parts 16 may be changed over the full length of the land part 16. That is, the widths of the major cutting edge land portion 161 and the flat cutting edge land portion 162 need not be constant over their respective full lengths, namely, in the entirety of the land parts 16, the width may be continuously or discontinuously increased from the flat cutting edge land portion 162 to the major cutting edge land portion 161.

So long as the relationship of W1$a$<W1$b$ is established, no particular limitation is imposed on the width of the minor cutting edge land portion 163. For example, from the viewpoint of size (thickness) control of the chips generated from the cutting edges 151-155 during cutting, the width of the major cutting edge land portion 161 and the width of the minor cutting edge land portion 163 are preferably set in the ratio of 1:0.5 to 1:1.3. Alternatively, the width of the major cutting edge land portion 161 and the width of the minor cutting edge land portion 163 may be substantially identical to each other (approximately 1:1).

Next, the angles of the individual land portions 161 to 165 are described. These land portions 161 to 165 are inclined with respect to the side surface 14, preferably at an angle of 85-105°. There is a tendency that a smaller angle with respect to the side surface 14 further reduces the cutting resistance during cutting, thereby enhancing the cutting performance.

Figure 8:
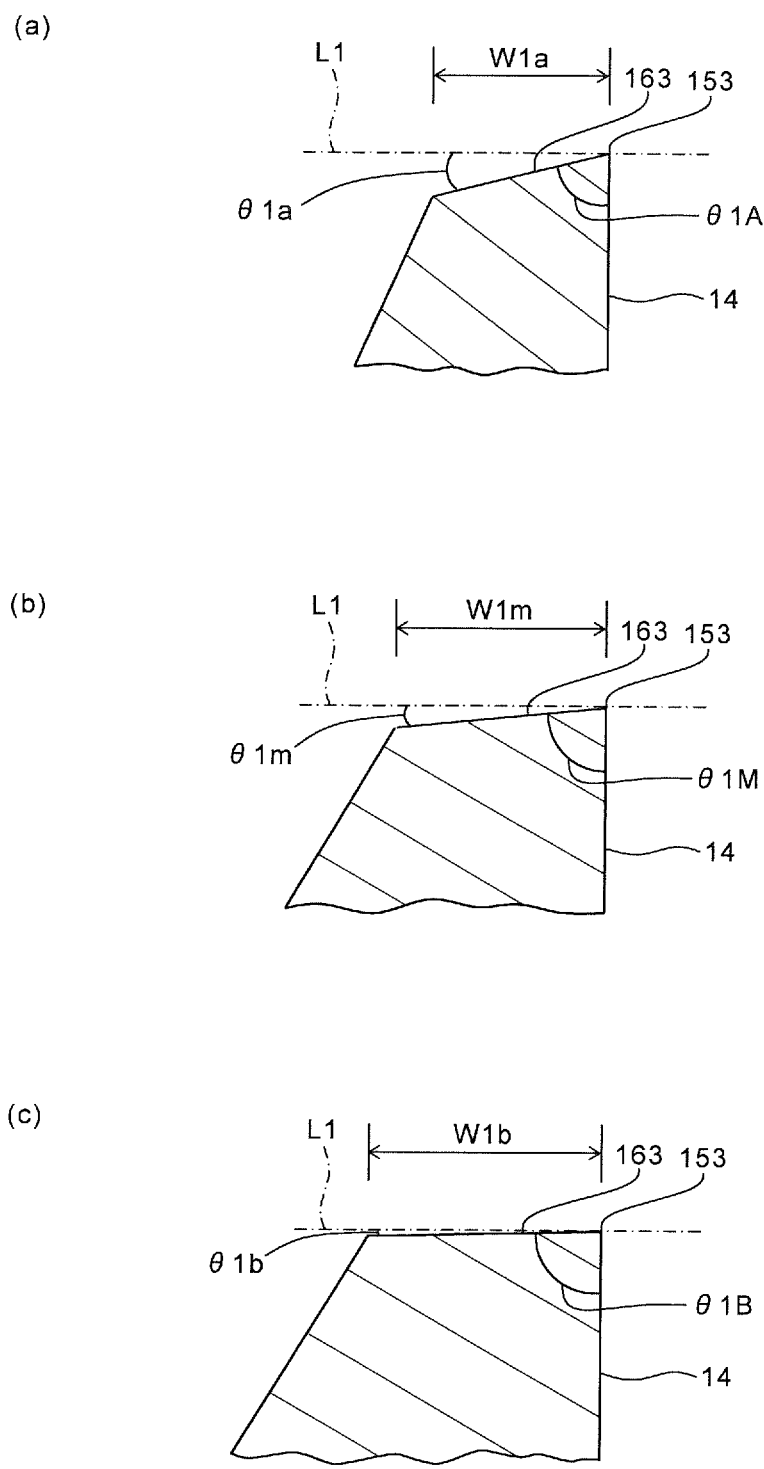
FIG. 8(a) is a schematic sectional view taken along the line C-C, showing a cross section of an end portion of a minor cutting edge land portion close to a flat cutting edge land portion in FIG. 7.
FIG. 8(b) is a schematic sectional view taken along the line D-D, showing a cross section of a central part of the minor cutting edge land portion.
FIG. 8(c) is a schematic sectional view taken along the line E-E, showing a cross section of an end portion of the minor cutting edge land portion close to a major cutting edge land portion.

In the present embodiment, the angles with respect to the side surface 14 have a relationship of (angle $\theta 1A$ at the end portion of the minor cutting edge land portion 163 close to the flat cutting edge land portion 162)<(angle $\theta 1B$ at the end portion of the minor cutting edge land portion 163 close to the major cutting edge land portion 161), as shown in FIGS. 8($a$) and 8($c$). Specifically, the angle $\theta 1A$ at the end portion close to the flat cutting edge land portion 162 and the angle $\theta 1B$ at the end portion close to the major cutting edge land portion 161 preferably have a relationship of $\theta 1A:\theta 1B=1:1$ to 1:1.3. As described above, in the insert 11 of the present embodiment, the side surface 14 is vertically connected to the upper surface 12 and the lower surface 13. Therefore, the foregoing contents can be rephrased as follows. That is, when in the inclination angle of the minor cutting edge land portion 163 on the basis of a line L1 passing through the minor cutting edge 153 and being orthogonal to the central axis (not shown) of the insert 11, an inclination angle at the end portion close to the flat cutting edge land portion 162 is denoted by $\theta 1a$, and an inclination angle at the end portion close to the major cutting edge land portion 161 is denoted by $\theta 1b$, $\theta 1a$ and $\theta 1b$ have a relationship of $\theta 1a > \theta 1b$. Here at, an inclination angle of the central part of the minor cutting edge land portion 163 on the basis of the line L1 is denoted by $\theta 1m$. Accordingly, the individual inclination angles have a relationship of $\theta 1A + \theta 1a = \theta 1M + \theta 1m = \theta 1B + \theta 1b = 90°$.

In the present embodiment, the angles of the land parts 16 with respect to the side surface 14, including the angle $\theta 1M$ of the central part of the minor cutting edge land portion 163 as shown in FIG. 8($b$), have a relationship of $\theta 1A < \theta 1M < \theta 1B$. That is, it is configured so that the angle of the minor cutting edge land portion 163 with respect to the side surface 14 is increased from the flat cutting edge land portion 162 to the major cutting edge land portion 161. In other words, there is a relationship of $\theta 1a > \theta 1m > \theta 1b$. The difference between $\theta 1A$ and $\theta 1B$ is preferably 0-15°.

The reason for thus decreasing the angle $\theta 1A$ close to the flat cutting edge land portion 162 and increasing the inclination angle $\theta 1a$ in the minor cutting edge land portion 163 is that high cutting performance is required in the bottom face finish of a workpiece. On the other hand, a high strength is required for the part close to the major cutting edge land portion 161. Hence, the angle $\theta 1B$ is increased, and the inclination angle $\theta 1b$ is decreased.

The angle change of the land parts 16 from the flat cutting edge land portion 162 to the major cutting edge land portion 161 may be either continuous or discontinuous. In other words, the inclination angle of the land parts 16 on the basis of a line L (not shown) passing through the cutting edges 15 and being orthogonal to the center axis of the insert 11 may be continuously or discontinuously decreased from the flat cutting edge land portion 162 to the major cutting edge land portion 161. The angles of the land parts 16 with respect to the side surface 14 may be changed in the region between the major cutting edge land portion 161 and the flat cutting edge land portion 162. That is, the angles of the land parts 16 with respect to the side surface 14 may be continuously or discontinuously increased from the flat cutting edge land portion 162 to the major cutting edge land portion 161 in the entirety of the region including the first corner cutting edge land portion 164, the minor cutting edge land portion 163, and the second corner cutting edge land portion 165. That is, the angle may be changed in one or both of the first corner cutting edge land portion 164 and the second corner cutting edge land portion 165.

Alternatively, the angles of the land parts 16 with respect to the side surface 14 may be changed over the full length of the land parts 16. That is, the angles of the major cutting edge land portion 161 and the flat cutting edge land portion 162 with respect to the side surface 14 need not to be constant over their respective full lengths, namely, the angles may be continuously or discontinuously increased from the flat cutting edge land portion 162 to the major cutting edge land portion 161 in the entirety of the land parts 16. In other words, the inclination angles of the major cutting edge land portion 161 and the flat cutting edge land portion 162 on the basis of the line L need not to be constant over their respective full lengths, namely, the inclination angles may be continuously or discontinuously decreased from the flat cutting edge land portion 162 to the major cutting edge land portion 161 in the entirety of the land parts 16.

No particular limitation is imposed on the angle of the minor cutting edge land portion 163 with respect to the side surface 14 so long as the relationship of $\theta 1A < \theta 1B$ is established. In other words, no particular limitation is imposed on the inclination angle of the minor cutting edge land portion 163 on the basis of the line L1, so long as the relationship of $\theta 1a > \theta 1b$ is established.

Thus, in the insert according to the present invention, the strength of the part of the minor cutting edge close to the major cutting edge is enhanced by increasing the width of the minor cutting edge land part close to the major cutting edge, and by decreasing the inclination angle thereof. Additionally, the cutting performance of the part of the minor cutting edge close to the flat cutting edge is enhanced by decreasing the width of the end portion of the minor cutting edge land portion close to the flat cutting edge, and by increasing the inclination angle thereof. Thus, the minor cutting edge achieves a satisfactory balance between the strength required for the major cutting edge and the cutting performance required for the flat cutting edge. Therefore, during the general cutting, the cutting can be carried out by using the minor cutting edge in addition to the major cutting edge, and the finished surface can be smoothed by the flat cutting edge. On the other hand, during the high feed (high feed rate cutting), the cutting is carried out only by the major cutting edge, and the finished surface can be smoothed by the minor cutting edge instead of the flat cutting edge.

Figure 9:
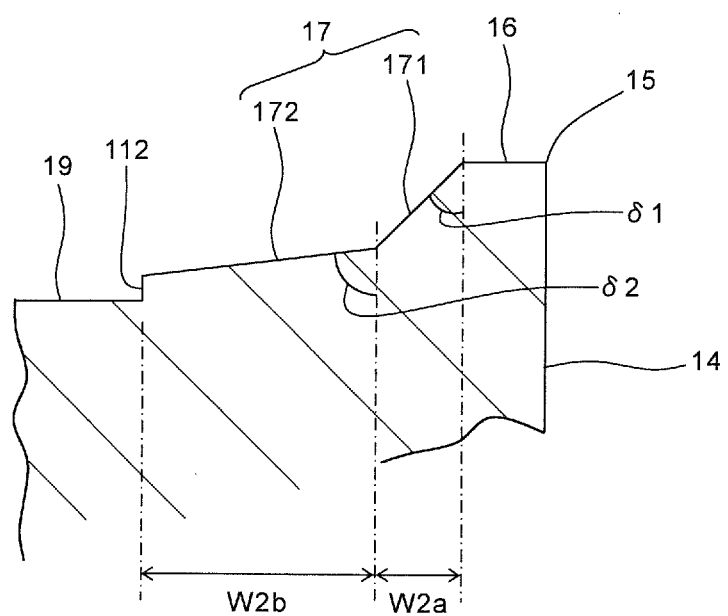
FIG. 9 is a schematic partial sectional view showing a rake face shape in the cutting insert shown in FIG. 5.

Referring to FIG. 9, a rake face 17 and a restriction face 19 are formed in the order named on the inside of the land parts 16. The rake face 17 enhances discharge performance by bringing chips into a helical shape. The rake face 17 is made up of a first rake face 171 inclined at an angle δ1 with respect to the side surface 14, and a second rake face 172 which is located closer to the central part of the upper surface 12 than the first rake face 171, and is inclined at an angle δ2 larger than the angle δ1 (δ1<δ2) with respect to the side surface 14.

When the width of the first rake face 171 is denoted by W2a, the width of the second rake face 172 is denoted by W2b, a region connecting both ends of the flat cutting edge 152 and the central part of the upper surface 12 is referred to as a flat cutting edge region, and a region connecting both ends of the major cutting edge 151 and the central part of the upper surface 12 is referred to as a major cutting edge region, W2a and W2b have the following relationships in the flat cutting edge region and the major cutting edge region.

(W2a in the flat cutting edge region)<(W2a in the major cutting edge region); and (W2b in the flat cutting edge region)>(W2b in the major cutting edge region)

Each of the widths of the first rake face 171 and the second rake face 172 indicates a distance in a direction orthogonal to the cutting edges 15 in a top view.

In the region between the flat cutting edge region and the major cutting region, namely, in the region connecting each of the first corner cutting edge 154, the minor cutting edge 153, and the second corner cutting edge 155, and the central part of the upper surface 12, W2a and W2b may be smoothly changed between the flat cutting edge region and the major cutting edge region. This configuration allows the chips to be smoothly discharged rearwardly.

A step 112 lowered from the rake face 17 to the restriction face 19 is preferably formed between the rake face 17 and the restriction face 19. Thereby, the restriction face 19 can be ensured widely, and the fixing of the insert 11 to the holder can be made more reliable, thus preventing the fixing of the insert 11 from being unstable during cutting. Other configurations are similar to those of the insert 1 of the first embodiment, and therefore the description thereof is omitted.

As a material constituting the foregoing inserts, for example, a PVD film or CVD film formed on the surface of a substrate composed of cemented carbide or cermet by PVD method or CVD method, or composite films of these films can be suitably used. In particular, a structure having the PVD film formed on the surface of a cemented carbide substrate is suitable in the machining necessitating chipping resistance, such as when cutting steel, stainless steel, or ductile cast iron. A structure having the CVD film formed on the surface of the cemented carbide substrate is suitable in the machining necessitating wear resistance, such as high-speed cutting of gray cast iron. A structure having the PVD film formed on the surface of a cermet substrate is suitable in finishing.

Cutting Tool (First Embodiment)

Figure 10:
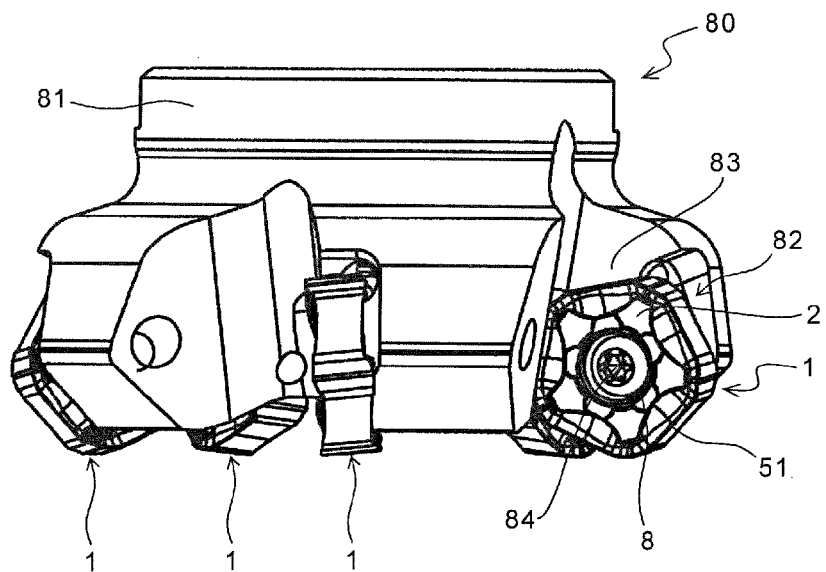
FIG. 10 is a side view showing a cutting tool according to a first embodiment of the present invention.

A first embodiment of the cutting tool according to the present invention is described in detail below with reference to FIGS. 10 and 11. As shown in FIG. 10, the cutting tool 80 (rotary cutting tool) of the present embodiment include a plurality of inserts 1, and a holder 81 configured to attach the plurality of inserts 1 thereto.

A plurality of insert pockets 82 are formed along the peripheral edge portion of the holder 81. The inserts 1 are respectively attached to peripheral positions in these insert pockets 82. Specifically, each of the inserts 1 is attached so that the major cutting edge 51 is located at the outermost periphery with the upper surface 2 oriented forwardly in the direction of rotation.

The attachment is performed, for example, by inserting an attachment screw 84 into an attachment screw contact portion 8 (screw hole) of each of the inserts 1, and then screwing the attachment screw 84 into a female screw formed in an attachment face 83 of the holder 81 or, alternatively, by passing the attachment screw 84 through a through hole formed in the holder 81, and then by fastening from the opposite side with a nut.

Figure 11:
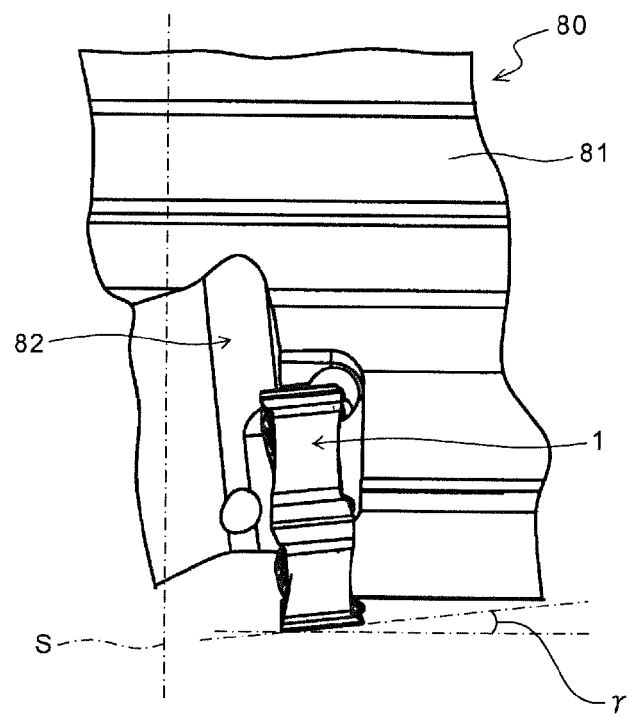
FIG. 11 is a partially enlarged view of the cutting tool shown in FIG. 10.

Referring to FIG. 11, each of the inserts 1 that is the negative-type insert is attached to the holder 81 with a negative axial rake γ in a side view. The negative axial rake γ is preferably approximately 6°. In the present embodiment, as shown in FIG. 2(b), the major cutting edge 51 and the minor cutting edge 53 are inclined downward away from the flat cutting edge 52. Therefore, as shown in FIG. 11, the major cutting edge 51 and the minor cutting edge 53 have a positive axial rake with respect to a rotation center axis S of the holder 81. Alternatively, the major cutting edge 51 and the minor cutting edge 53 may have a negative axial rake with respect to the rotation center axis S of the holder 81. The cutting tool 80 performs cutting with the major cutting edge 51, the minor cutting edge 53, and the flat cutting edge 52 by rotating the holder 81.

(Second Embodiment)

Figure 12:
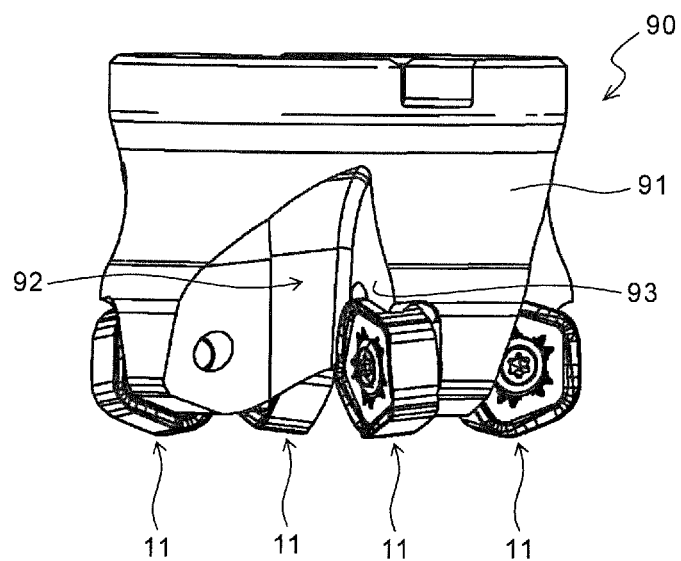
FIG. 12 is a side view showing a cutting tool according to a second embodiment of the present invention.
Figure 13:
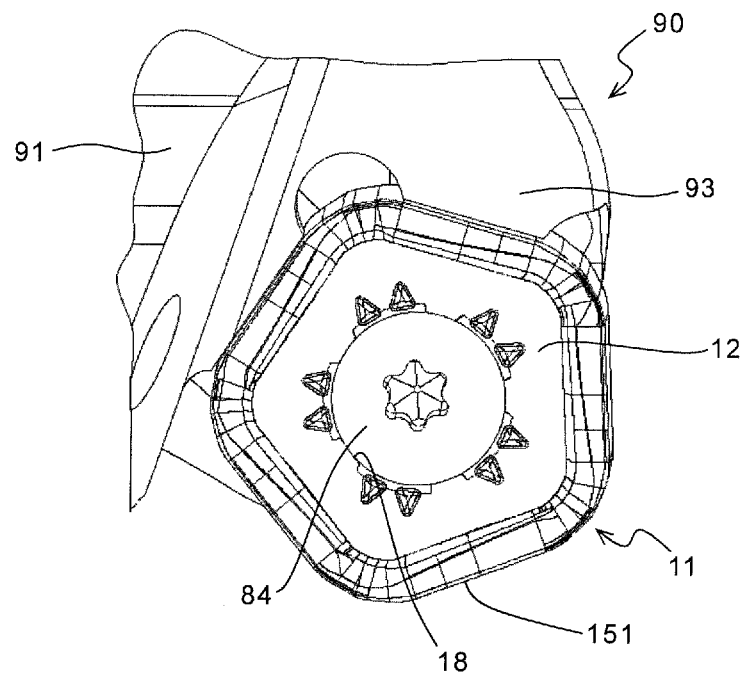
FIG. 13 is a partially enlarged view of the cutting tool shown in FIG. 12.

A second embodiment of the cutting tool according to the present invention is described in details below with reference to FIGS. 12 and 13. In FIGS. 12 and 13, the components similar to those in FIGS. 10 and 11 are denoted by like reference numerals, and therefore the description thereof is omitted. Referring to FIGS. 12 and 13, the cutting tool 90 of the present embodiment includes a plurality of inserts 11, and a holder 91 configured to attach the plurality of inserts 11 thereto. A plurality of insert pockets 92 are disposed with a gap each other in a circumferential direction along a peripheral edge portion of the holder 91.

The insert pockets 92 are substantially V-shaped cut-out portions in a flat view, and the inserts 11 are respectively attached to a plurality of attachment faces 93 formed by these cut-out portions. The inserts 11 are attached by orienting the upper surface 12 forwardly in the direction of rotation, and allowing the major cutting edge 151 to protrude from the outer periphery of the holder 91.

In the cutting tool 90, the rotation center axis of the holder 91 is disposed substantially perpendicular to the surface of a workpiece. At this time, the major cutting edge 151 is inclined at an angle of approximately 45° with respect to the workpiece. The inserts 11 have a negative axial rake of approximately 6° in a side view.

The cutting tool 90 is configured to perform cutting of the workpiece by using the minor cutting edge 153 in addition to the major cutting edge 151, and also smooth the finished surface of the workpiece by the flat cutting edge 152. Therefore, the peripheral cutting edge angle of the minor cutting edge 153 is set to 1.2 times or more, preferably 1.5 times or more the peripheral cutting edge angle of the major cutting edge 151.

The cutting tool 90 performs cutting with the major cutting edge 151, the minor cutting edge 153, and the flat cutting edge 152 by rotating the holder 91. Other configurations are similar to those of the cutting tool 80 of the first embodiment, and therefore the description thereof is omitted.

(Third Embodiment)

Figure 14:
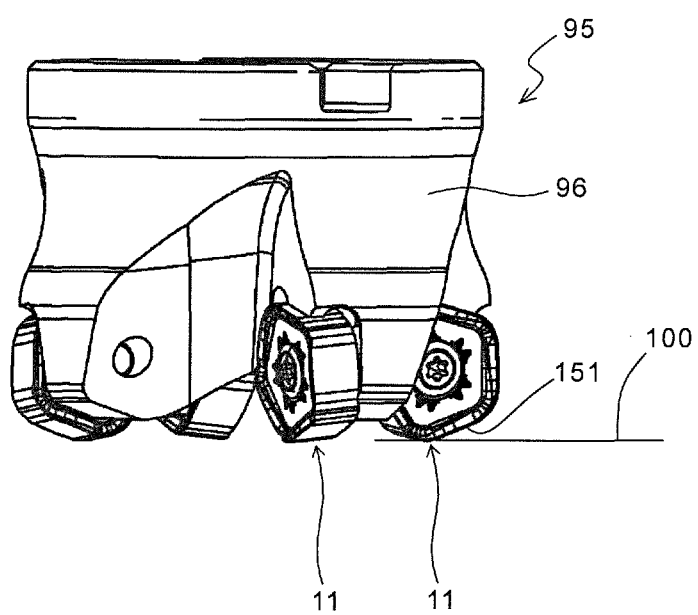
FIG. 14 is a side view showing a cutting tool according to a third embodiment of the present invention.

A third embodiment of the cutting tool according to the present invention is described in details below with reference to FIG. 14. In FIG. 14, the components similar to those in FIGS. 10 to 13 are denoted by like reference numerals, and therefore the description thereof is omitted.

Referring to FIG. 14, the cutting tool 95 of the present embodiment includes a plurality of inserts 11, and a holder 96 configured to attach the plurality of inserts 11 thereto. The holder 96 has substantially the same configuration as the holder 91 in the second embodiment. In the holder 96, the major cutting edge 151 of each of the inserts 11 contacts against a workpiece 100 at a relatively gentle inclination of approximately 30°.

The foregoing inserts 11 are also used in the cutting tool 95, thus producing action and effect such as breakage prevention of the corner parts, and elongated life time of the inserts 11. The cutting tool 95 is especially suitable for ultra high feed cutting. The ultra high feed indicates cutting satisfying the condition that the feed per tooth by each insert 11 is 0.7 mm/t or more.

The cutting tool 95 is configured to perform cutting of the workpiece 100 only by the major cutting edge 151, and smooth the finished surface of the workpiece 100 by the minor cutting edge 153 instead of the flat cutting edge 152. Therefore, the peripheral cutting edge angle of the minor cutting edge 153 is set to 1.1 times or more, preferably 1.3 times or more the peripheral cutting edge angle of the major cutting edge 151. Other configurations are similar to those of the cutting tool 80 of the first embodiment and the cutting tool 90 of the second embodiment, and therefore the description thereof is omitted.

Method of Manufacturing Machined Product

Figure 15:
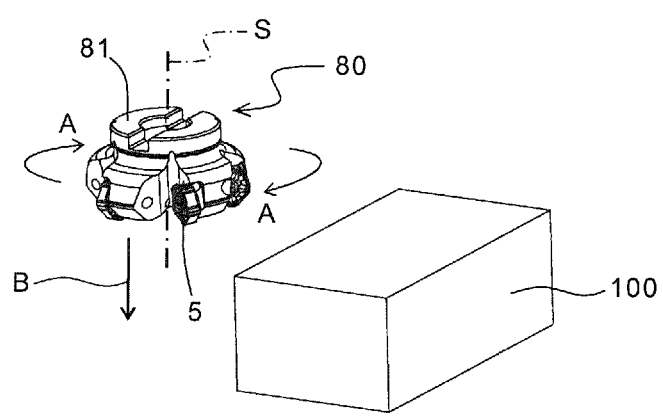
FIGS. 15(a) to 15(c) are process drawings showing a method of manufacturing a machined product according to an embodiment of the present invention.
Figure 15:
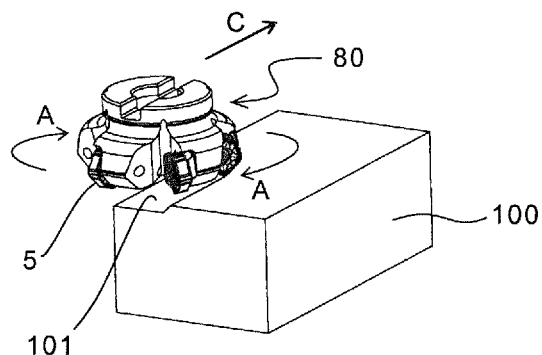
Figure 15:
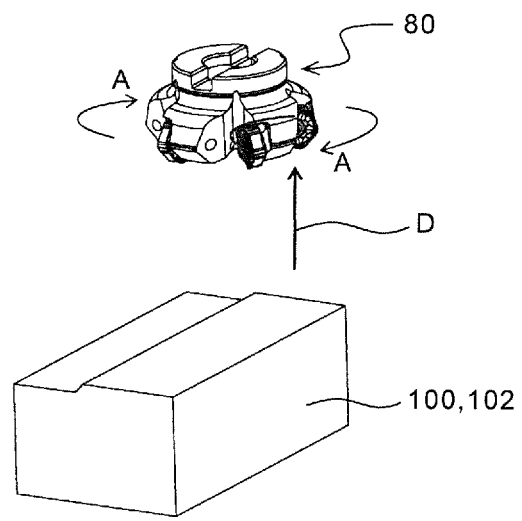

An embodiment of the method of manufacturing a machined product according to the present invention is described in detail with reference to FIG. 15, by taking the case of using the cutting tool 80 as example. As shown in FIG. 15, the method of manufacturing the machined product according to the present embodiment includes the step of rotating the cutting tool 80; the step of bringing the cutting edges 5 of the rotating cutting tool 80 into contact with the surface of the workpiece 100; and the step of separating the cutting tool 80 from the workpiece 100.

To be specific, firstly, the inserts 1 are attached to the holder 81. At this time, the inserts 1 are attached to the insert pockets 82 of the holder 81 along the same circumference of the holder 81.

Subsequently, as shown in FIG. 15(a), the workpiece 100 is fixed to a milling machine, and the cutting tool 80 is rotated in the direction of arrow A around the rotation center axis S of the holder 81. Then, the cutting edges 5 are brought near the workpiece 100 so as to set an appropriate depth of cut by moving the cutting tool 80 in the direction of arrow B.

Thereafter, as shown in FIG. 15(b), the surface of the workpiece 100 is cut by bringing the cutting edges 5 of the rotating cutting tool 80 into contact with the surface of the workpiece 100, and by moving the cutting tool 80 in the direction of arrow C. For example, the cutting tool 80 is capable of cutting the surface of the workpiece 100 in substantially parallel.

To be more specific, the major cutting edge 51 and the minor cutting edge 53 contact against an arcuate portion lying ahead in a feed direction, thereby cutting the workpiece 100 by an amount corresponding to the depth of cut. At this time, the plurality of inserts 1 sequentially enter a cutting region and proceed cutting, and hence, arcuate lines (cutting traces) remain on the surface 101 of the workpiece 100. These arcuate lines are then cut by the flat cutting edge 52, thereby smoothing the surface 101. As seen from FIG. 10, only the part (lower part) of the major cutting edge 51 close to the minor cutting edge 53 is actually cut into the workpiece 100 by a predetermined depth of cut.

Subsequently, as shown in FIG. 15(c), after the cutting tool 80 passes through the workpiece 100, the cutting tool 80 is separated from the workpiece 100 by moving the cutting tool 80 in the direction of arrow D. When the cutting is continued, the step of bringing the cutting edge 5 of the cutting tool 80 into contact with the same portion or different portions of the workpiece 100 may be repeated while retaining the rotation of the cutting tool 80. Thus in the foregoing cutting method, a series of actions that each of the inserts 1 contacts against the workpiece 100 and performs cutting, and then separates from the workpiece 100 are sequentially repeated. As the result, the machined product 102 is obtained.

When the cutting edge 5 in use is worn, an unused cutting edge 5 may be used by rotating the insert 1 around the center axis of the insert 1, or by reversing the upper and lower surfaces. A similar effect can be produced even when the cutting tool 90 of the second embodiment or the cutting tool 95 of the third embodiment is used instead of the cutting tool 80.

While the several embodiments according to the present invention have been described and illustrated above, it is to be understood that the present invention is not limited to the foregoing embodiments and is applicable to any optional embodiments without departing from the gist of the present invention.

The invention claimed is:

1. A cutting insert, comprising:
   an upper surface;
   a lower surface;
   a side surface;
   a cutting edge which is located along an intersection of the upper surface and the side surface, and comprises a major cutting edge, a flat cutting edge, and a minor cutting edge located between the major cutting edge and the flat cutting edge;
   an insert center axis defined by a line passing through a center of the upper surface and a center of the lower surface
   a land part located along the cutting edge on the upper surface;
   a rake face located between the land part and a central portion of a central part of the upper surface and having a rake surface angle defined as an angle formed between a line that in a sectional side view lays tangent to the rake surface, and a line that passes through the cutting edge that is orthogonal to the insert center axis,
wherein
   the land part comprises
      a minor cutting edge land portion located correspondingly to the minor cutting edge, and
      a major cutting edge land portion located correspondingly to the major cutting edge,
   the minor cutting edge land portion is inclined downward toward a central part of the upper surface, and
   a first inclination angle ($\theta 1$) and a second inclination angle ($\theta 2$) are smaller than the rake surface angle, and the first inclination angle ($\theta 1$) is greater than the second inclination angle ($\theta 2$), where the first inclination angle ($\theta 1$)

denotes an inclination angle of the minor cutting edge land portion on the basis of a first line (L1) passing through the minor cutting edge and being orthogonal to the center axis of the cutting insert, and the second inclination angle ($\theta 2$) denotes an inclination angle of the major cutting edge land portion on the basis of a second line (L2) passing through the major cutting edge and being orthogonal to the center axis, wherein the major cutting edge land portion is inclined downward toward the central part of the upper surface.

2. The cutting insert according to claim 1, wherein a difference between the first inclination angle ($\theta 1$) and the second inclination angle ($\theta 2$) is 3° or more.

3. The cutting insert according to claim 1, wherein the side surface is vertically connected to the upper surface and the lower surface.

4. The cutting insert according to claim 1, wherein a width of the minor cutting edge land portion in a direction orthogonal to the minor cutting edge is equal to a width of the major cutting edge land portion in a direction orthogonal to the major cutting edge in a top view.

5. The cutting insert according to claim 1, wherein the minor cutting edge is inclined downward from the flat cutting edge to the major cutting edge in a side view.

6. The cutting insert according to claim 1, wherein the cutting edge further comprises: a first corner cutting edge located between the major cutting edge and the minor cutting edge; and a second corner cutting edge located between the minor cutting edge and the flat cutting edge, and both the first corner cutting edge and the second corner cutting edge have a curved shape in a top view.

7. The cutting insert according to claim 6, wherein a radius of curvature of the first corner cutting edge is larger than a radius of curvature of the second corner cutting edge in a top view.

8. The cutting insert according to claim 1, wherein the land part further comprises
a flat cutting edge land portion located correspondingly to the flat cutting edge, and
a second width (W1$b$) is greater than a first width (W1$a$) in a top view, when in a width of the minor cutting edge land portion in a direction orthogonal to the minor cutting edge, a width at an end portion close to the flat cutting edge land portion is denoted by the first width (W1$a$), and a width at an end portion close to the major cutting edge land portion is denoted by the second width (W1$b$), and
a third inclination angle ($\theta 1a$) is greater than a fourth inclination angle ($\theta 1b$), when in an inclination angle of the minor cutting edge land portion on the basis of the first line (L1) passing through the minor cutting edge and being orthogonal to the center axis of the cutting insert, an inclination angle at an end portion close to the flat cutting edge land portion is denoted by the third inclination angle ($\theta 1a$), and an inclination angle at an end portion close to the major cutting edge land portion is denoted by the fourth inclination angle ($\theta 1b$).

9. The cutting insert according to claim 8, wherein a width of the minor cutting edge land portion in a direction orthogonal to the minor cutting edge is increased from the flat cutting edge land portion to the major cutting edge land portion.

10. The cutting insert according to claim 8, wherein the first width (W1$a$) and the second width (W1$b$) have a relationship of 1:1.1 to 1:4.

11. The cutting insert according to claim 8, wherein an inclination angle of the minor cutting edge land portion is decreased from the flat cutting edge land portion to the major cutting edge land portion.

12. The cutting insert according to claim 8, wherein a difference between the third inclination angle ($\theta 1a$) and the fourth inclination angle ($\theta 1b$) is 0-15°.

13. The cutting insert according to claim 8, wherein the cutting edge further comprises: a first corner cutting edge located between the major cutting edge and the minor cutting edge; and a second corner cutting edge located between the minor cutting edge and the flat cutting edge.

14. A cutting tool, comprising:
a cutting insert according to claim 1; and
a holder configured to attach the cutting insert thereto.

15. The cutting tool according to claim 14, wherein the cutting insert is attached to the holder so that the major cutting edge and the minor cutting edge have a positive or negative axial rake with respect to a rotation center axis of the holder.

16. A method of manufacturing a machined product, comprising:
rotating a cutting tool according to claim 14;
bringing the cutting edge of the rotating cutting tool into contact with a surface of a workpiece; and
separating the cutting tool from the workpiece.

* * * * *